(12) United States Patent
Ueyoko et al.

(10) Patent No.: US 6,318,430 B1
(45) Date of Patent: Nov. 20, 2001

(54) PNEUMATIC TIRE WITH HYBRID MATERIAL BEAD APEX

(75) Inventors: Kiyoshi Ueyoko, Kobe; Yasuhisa Minagawa, Akashi, both of (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/334,724

(22) Filed: Jun. 17, 1999

(51) Int. Cl.$^7$ .............................. B60C 1/00; B60C 15/04; B60C 15/06
(52) U.S. Cl. ...................... 152/458; 152/540; 152/541; 152/547
(58) Field of Search .................................. 152/541, 547, 152/540, 458

(56) References Cited

U.S. PATENT DOCUMENTS

| 1,349,898 | 8/1920 | Marquette . |
| 1,606,885 | 11/1926 | Maynard . |
| 1,611,144 | 12/1926 | Hopkins . |
| 4,236,563 | 12/1980 | Moers et al. . |
| 4,711,285 | 12/1987 | Ogawa et al. . |
| 5,593,522 | 1/1997 | Neddenriep et al. . |

FOREIGN PATENT DOCUMENTS

| 0645424A1 | 3/1995 | (EP) . |
| 3-28243 | * 2/1991 | (JP) ...................................... 152/547 |

\* cited by examiner

*Primary Examiner*—Adrienne C. Johnstone
(74) *Attorney, Agent, or Firm*—Birch, Stewart, Kolasch & Birch, LLP

(57) ABSTRACT

A pneumatic tire comprises a bead apex disposed in each bead portion, and a carcass ply extending between the bead portions and turned up in each bead portion so as to wrap the bead apex therein, the bead apex made of a hybrid material which is compounded from rubber, synthetic resin and short fiber at least. Preferably, the short fiber has an average diameter of 0.01 to 0.20 mm and an average length of 1.0 to 10.0 mm, and the proportion of the short fiber is 3 to 15 parts by weight with respect to 100 parts by weight of the rubber. The hybrid material has a 100% modulus of at least 10.0 MPa, a tensile strength of at least 10.0 MPa, a breaking elongation EB of at least 200%, a Mooney viscosity of from 30 to 50 ML1+4, and a scorch time (t10) of at least 20 minutes.

6 Claims, 6 Drawing Sheets

PNEUMATIC TIRE WITH HYBRID MATERIAL BEAD APEX

BACKGROUND OF THE INVENTION

1. Field of the Invention

The present invention relates to a pneumatic tire in which a occurrence of voids in bead portions can be controlled and bead durability can be improved.

2. Description of the Related Art

In a pneumatic tire, as shown in FIG. 6(A), a carcass (a) is turned up around bead cores (b) to be secured thereto, and bead apex rubber (c) is filled between a ply main portion (a1) and each ply turnup portion (a2) of the carcass (a), thereby ensuring necessary bead rigidity.

In conventional heavy duty tires for trucks, buses and the like, the volume of the bead apex rubber (c) is increased to increase the bead rigidity and thereby to improve bead durability.

On the other hand, in recent years, a bead structure is revamped for weight reduction of the tire. FIG. 6(B) shows such a technique for reducing weight while improving the bead durability. In this technique, contrary to the above, the volume and height of bead apex rubber (c) are greatly decreased, and the height of a ply turnup portion (a2) is increased so that the ply turnup portion (a2) adjoins the ply main portion (a1). (hereinafter, referred to as a new bead structure).

In this new bead structure, the bead apex rubber (c) requires higher strength and higher rigidity than in the conventional structure. Therefore, the carbon black and/or crosslinking agent are increased. However, when the amount of carbon black is increased, rubber flowing during vulcanizing the tire becomes insufficient because of high viscosity, and, in the vulcanized tire, voids are liable to occur near the radially outer end (e) of the bead apex rubber (c). When the large amount of crosslinking agent is added, quality of a product tends to be impaired because rubber scorching may occur during extruding the rubber.

In the new bead structure, further, the height (h) is set as small as possible for the bead durability. However, as a degree of bending of the carcass ply turnup portion (a2) occurring below the adjacent region (g) is greatly increased due to the decreased bead apex rubber volume, its spring-back force during vulcanization is strong, and thus a tendency of occurrence of voids is further increased as the height (h) is decreased.

BRIEF SUMMARY OF THE INVENTION

It is therefore, an object of the present invention to provide a pneumatic tire in which occurrence of voids can be effectively controlled, without hindering the weight reduction and the improvement in bead durability.

According to the present invention, a pneumatic tire comprises a tread portion, a pair of sidewall portions, a pair of bead portions, a bead apex disposed in each bead portion, and a carcass ply extending between the bead portions and turned up in each bead portion so as to wrap the bead apex therein, the bead apex made of a hybrid material which is compounded from rubber, synthetic resin and short fiber at least.

Preferably, the short fiber has an average diameter of 0.01 to 0.20 mm and an average length of 1.0 to 10.0 mm, and the proportion of the short fiber is 3 to 15 parts by weight with respect to 100 parts by weight of the rubber. The hybrid material has a 100% modulus of at least 10.0 MPa, a tensile strength of at least 10.0 MPa, a breaking elongation EB of at least 200%, a Mooney viscosity of from 30 to 50 ML 1+4, and a scorch time (t10) of at least 20 minutes.

BRIEF DESCRIPTION OF THE DRAWINGS

Embodiments of the present invention will now be described in detail in conjunction with the accompanying drawings.

DETAILED DESCRIPTION OF THE INVENTION

Figure 1:
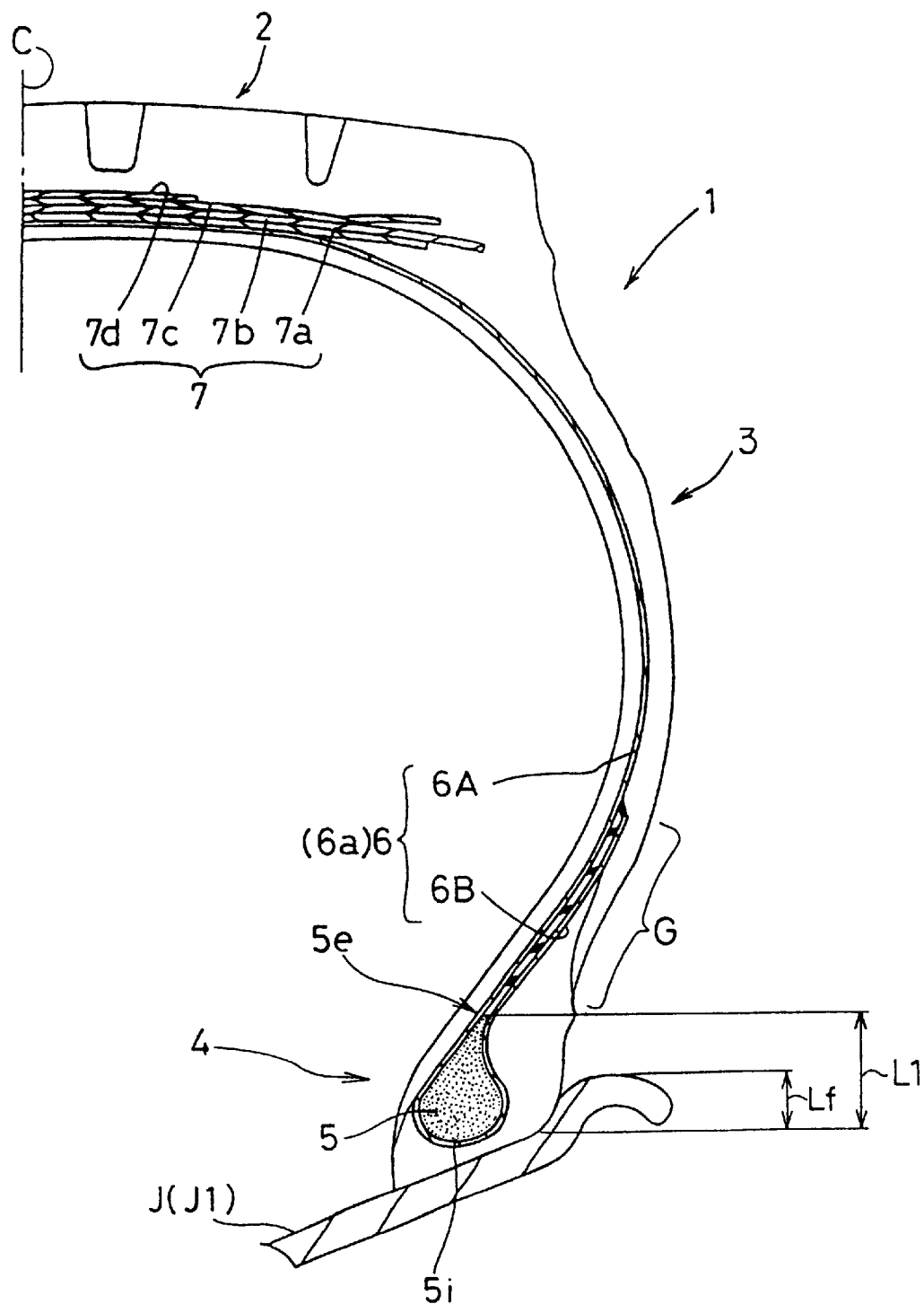
FIG. 1 is a cross sectional view of a tire according to the present invention.

In FIG. 1, the tire 1 comprises a tread portion 2, a pair of sidewall portions 3, a pair of bead portions 4, a toroidal carcass 6 extending between the bead portions 4, and a belt 7 disposed radially outside the carcass 6 in the tread portion 2.

In this embodiment, the tire 1 is a heavy duty tubeless radial tire for trucks and buses. FIG. 1 shows a normal state in which the tire 1 is mounted on a standard rim J, inflated to a standard inner pressure and not loaded. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. However, in case of a passenger car tire, 180 KPa should be used as the "standard pressure".

The belt 7 comprises at least two cross plies of parallel cords. For the belt cords, steel cords and organic fiber cords, e.g. rayon, nylon, aromatic polyamide and the like can be used. In FIG. 1, the belt 7 is composed of four plies: an radially innermost ply 7a made of cords laid at an angle of from 50 to 70 degrees with respect to the tire equator C, and second to fourth plies 7b, 7c and 7d made of cords laid at a small angle of not more than 30 degrees with respect to the tire equator C.

The carcass 6 comprises at least one ply 6a of cords arranged radially at angles in the range of from 70 to 90 degrees with respect to the tire equator C. For the carcass cords, steel cords are preferably used but organic fiber cords of nylon, rayon, polyester, aromatic polyamide, and the like can be used. In this embodiment, the carcass 6 comprises a single ply 6a of steel cords arranged radially at substantially 90 degrees with respect to the tire equator C.

Figure 2:
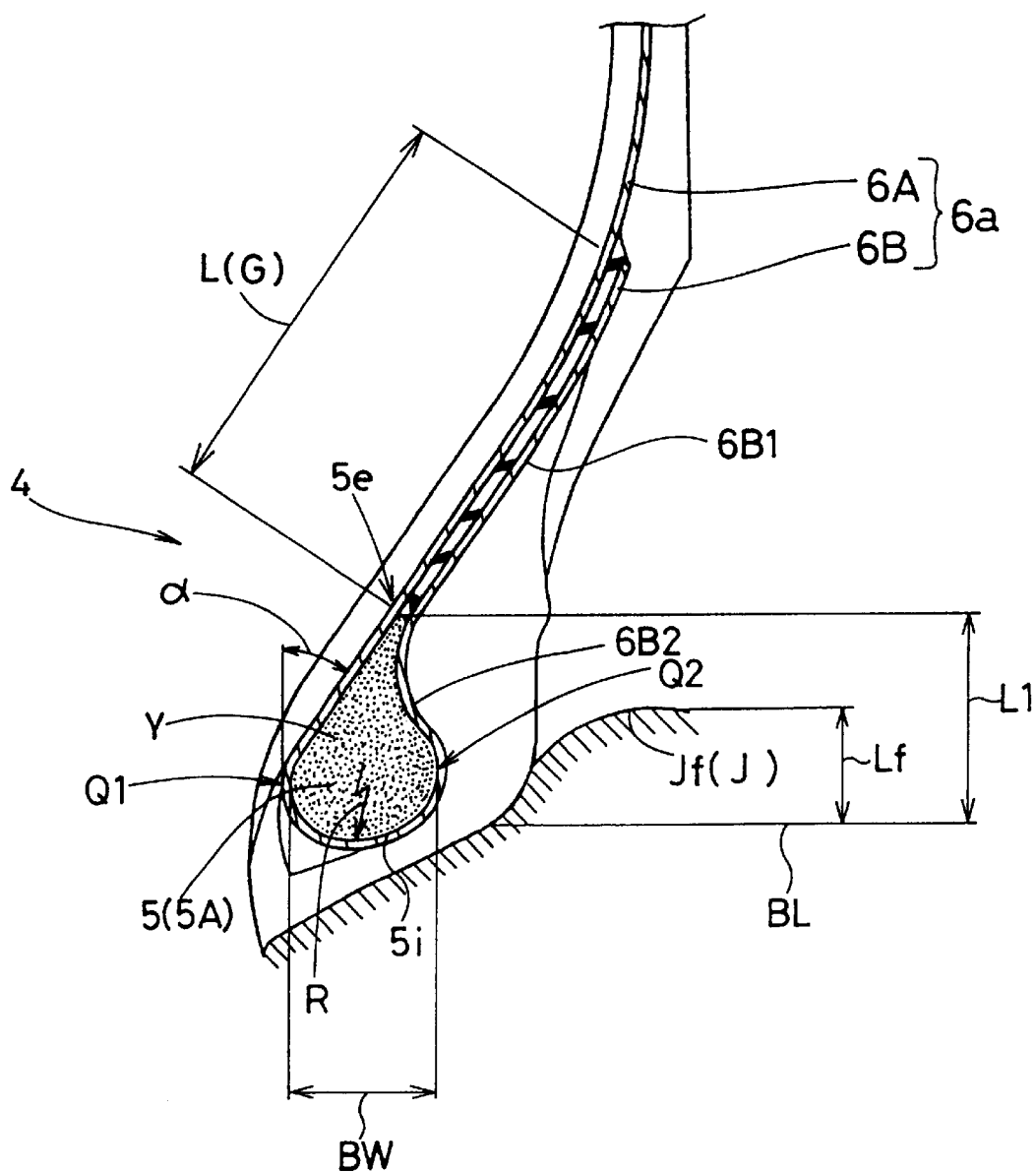
FIG. 2 is a cross sectional view of the bead portion thereof.

The carcass ply 6a extends between the bead portions 4 through the tread portion 2 and sidewall portions 3, and is turned up in the bead portions 4 from the axially inside to the outside of the tire so as to form a turnup portion 6B in each bead portion 4 and a main portion 6A extending therebetween. As shown in FIG. 2, an upper part 6B1 of the turnup portion 6B adjoins the main portion 6A to form an adjacent region G in which the turnup portion 6B and the main portion 6A are substantially parallel with each other.

Further, on the radially inside of the adjacent region G, there is formed a space Y which is defined as surrounded by the remaining lower part 6B2 of the turnup portion 6B and the main portion 6A and which has a cross sectional shape like a water-drop.

In the adjacent region G, a thickness of rubber between the carcass cords of the main portion 6A and those of the turnup portion 6B is set in the range of from 0.15 to 4.5 times, preferably 1.3 to 3.5 times the maximum diameter of the carcass cords, whereby a shear force therebetween can be mitigated and separation failures can be effectively prevented.

At least the adjacent region G, the main portion 6A is substantially straight, and preferably, this straight part extends to a position lower than the rim flange (Lf) or lower than a center of the water-drop-shaped space Y. The inclination angle $\alpha$ of the straight part is in the range of from 25 to 45 degrees with respect to the tire equatorial plane C.

As to the turnup portion 6B, on the other hand, a part immediately radially inside the region G is curved concavely.

Figure 4:
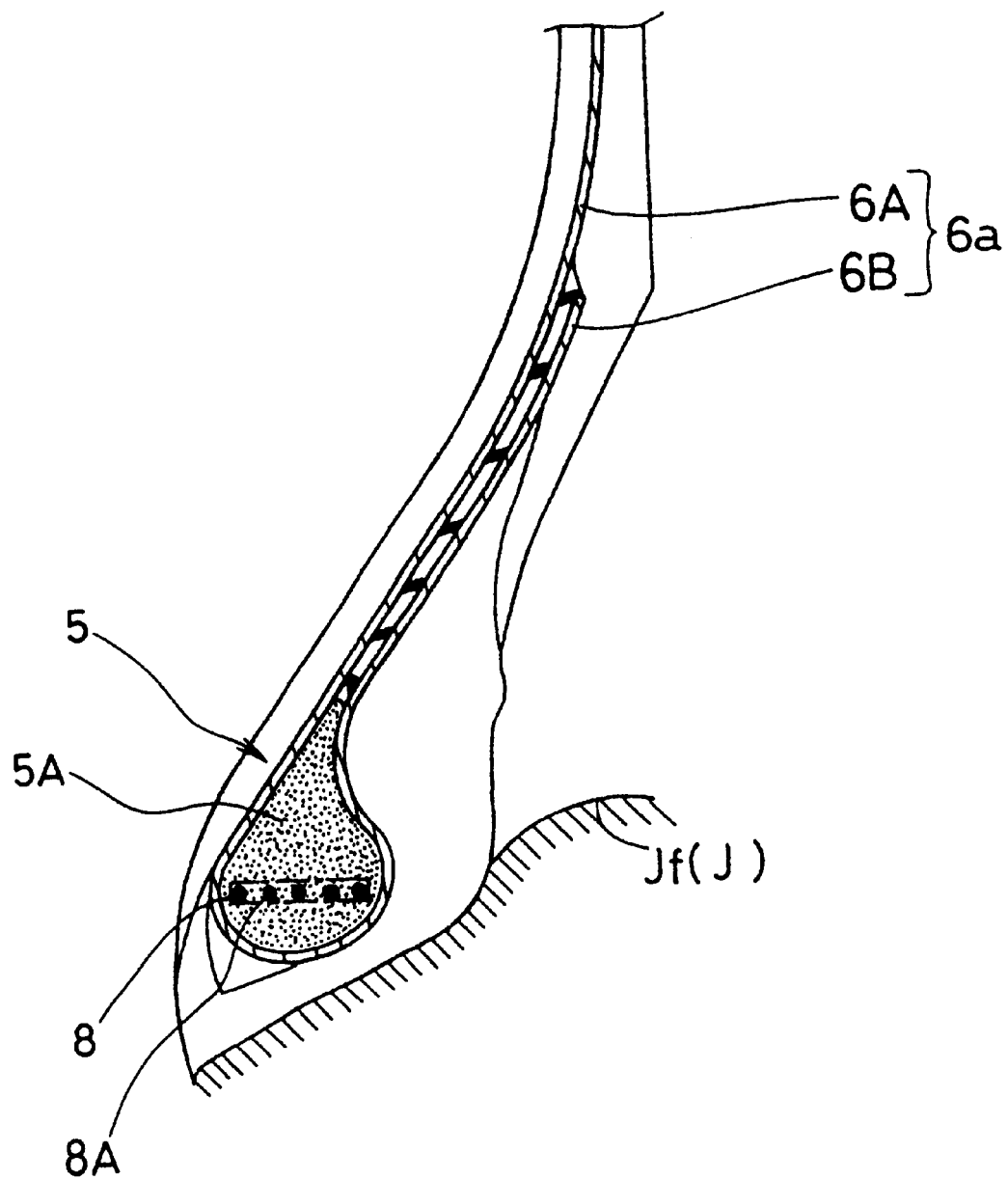
FIG. 4 is a cross sectional view of another example of the bead apex.
Figure 5:
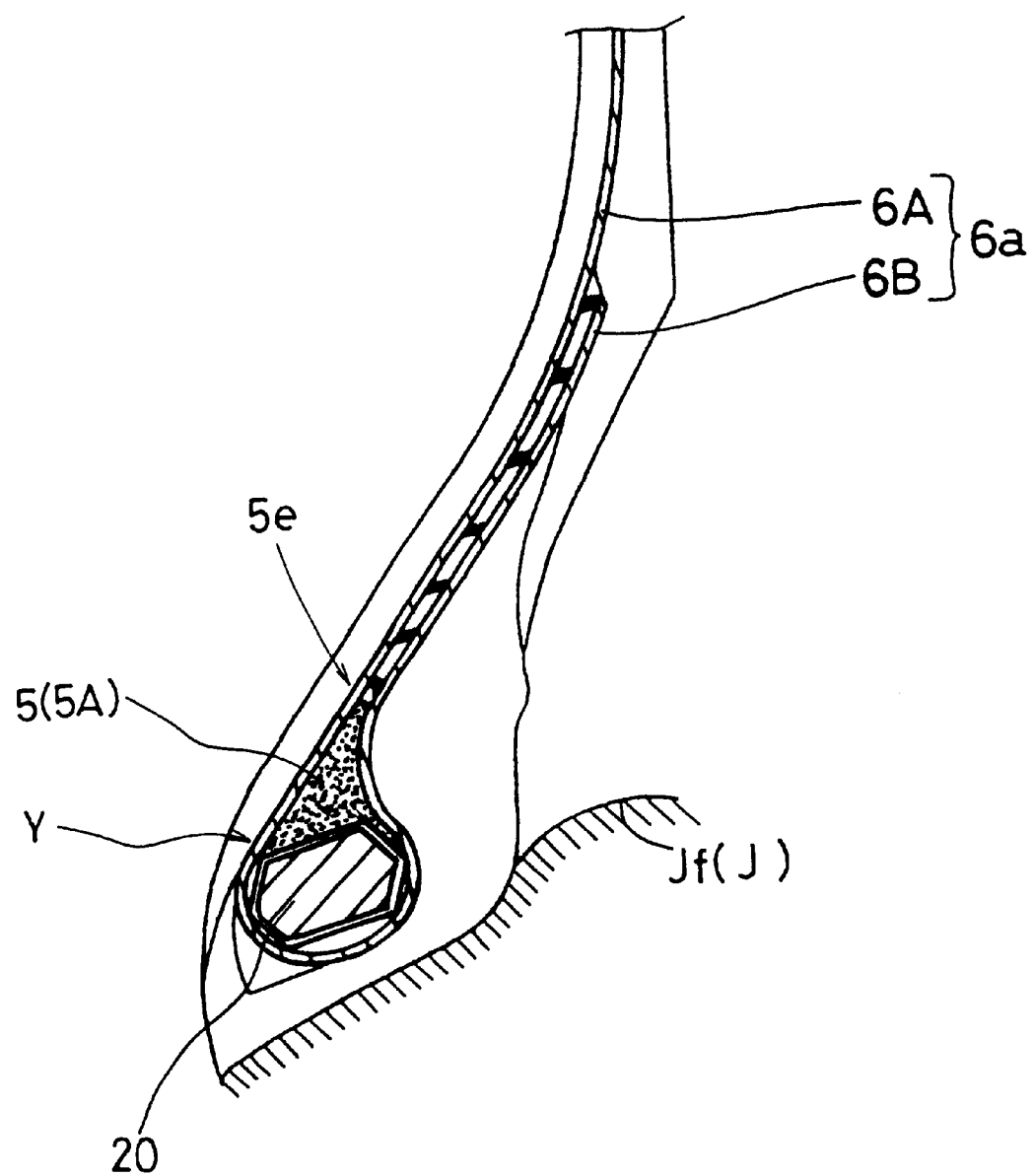
FIG. 5 is a cross sectional view of still another example of the bead apex.

In the above-mentioned space Y, a bead-apex 5 is disposed. In FIG. 2, the space Y is filled with only the bead apex 5. In FIG. 4, the space Y is filled with the bead apex 5 and a reinforcing cord layer 8. In FIG. 5, the space Y is filled with the bead apex 5 and a bead core 20.

The bead-apex 5 is made of a hybrid material which is compound from rubber, synthetic resin, and short fiber.

For the rubber, one of or a combination of natural rubber (NR), isoprene rubber (IR), styrene butadiene rubber (SBR), butadiene rubber (BR), isobutylene-isoprene rubber (IIR), nitrile rubber (NBR), and ethylene propylene rubber (EPDM) can be used.

For the synthetic resin, phenol-terpene base resin (e.g., SP1068 produced by Nippon Shokubai Co., Ltd.), petroleum base hydrocarbon resin (e.g., Escorets 1102 produced by Exon Kagaku), and the like can be used.

For the short fiber, organic short fiber, e.g. nylon, polyester, rayon, aromatic polyamide and the like can be suitably used. Preferably, the average diameter thereof is 0.01 to 0.20 mm and the average length is 1.0 to 10.0 mm. Monofilaments which are not engaged with each other are preferably used. If fibers or filaments which are twisted thus engaged with each other are used, the fibers rub against each other and durability tends to be decreased. Further, it is preferable that the surface of the short fiber is applied to a treatment for improving adhesion to rubber, for example, dipping into a fluid such as RFL. The proportion of the short fiber is preferably 3 to 15 parts by weight with respect to 100 parts by weight of the rubber. Organic short fibers are preferably used, but metal (steel) fibers may be used.

Further, into the hybrid material, various additives such as vulcanizing agent, reinforcing agent, age resistor, vulcanization accelerator, auxiliary vulcanization accelerator, vulcanization retarder, plasticizer and the like may be added.

For the vulcanizing agent, sulfur can be used.

For the reinforcing agent, carbon black, silica, clay, aluminum hydroxide, calcium carbonate and the like can be used.

For the age resistor,
imidazoles such as 2-mercaptobenzimidazole;
amines such as phenyl-α-naphthylamine,
   N,N'-di-β-naphthyl-P-phenylenediamine,
   N-phenyl-N'-isopropyl-P-phenylenediamine;
phenols such as di-t-butyl-P-cresol,
   styrenated phenol;
and the like can be used.

For the vulcanization accelerator,
inorganic accelerator such as hydrated lime,
   magnesium oxide,
   titanium oxide,
   litharge (PbO), and
organic accelerator, e.g.
   thiuram-base vulcanization accelerator such as
     tetramethylthiuramdisulfide and
     tetramethylthiurammonosulfide;
   dithiocarbamates such as zinc dibutyldithiocarbamate,
     zinc diethyldithiocarbamate,
     sodium dimethyldithiocarbamate,
     tellurium diethyldithiocarbamate;
   thiazoles such as 2-mercaptobenzothiazole,
     N-cyclohexyl-2-benzothiazolesulfenamide;
   thioureas such as trimethylthiourea,
     N,N'-diethylthiourea;
and the like can be used.

For the auxiliary vulcanization accelerator,
metal oxide such as hydrozincite;
fatty acid such as stearic acid,
   oleic acid,
   cottonseed fatty acid;
and the like can be used.

For the vulcanization retarder,
aromatic organic acid such as salicylic acid,
   phthalic anhydride,
   benzoic acid;
nitroso compound such as N-nitrosodiphenylamine,
   N-nitroso-2,2,4-trimethyl-1,2-dihydroquinone,
   N-nitrosophenyl-β-naphthylamine;
and the like can be used.

For the plasticizer, paraffin-base oil, naphthene-base oil, aromatic-base oil and the like can be used.

In order to improve rubber flow during vulcanization and also rubber scorching during extruding, the proportion of carbon black and the proportion of crosslinking agent are decreased as compared with conventional bead apex rubber.

Table 1 shows examples of hybrid material for the bead apex.

TABLE 1

|  | 1 | 2 | 3 | 4 | 5 | 6 | 7 | 8 |
|---|---|---|---|---|---|---|---|---|
| Rubber(parts by weight) | 100 | 100 | 100 | 100 | 100 | 100 | 100 | 100 |
| HAF carbon (parts by weight) | 80 | 100 | 50 | 50 | 50 | 50 | 50 | 50 |
| Short fiber (parts by weight) | — | — | — | 5 | 7 | 15 | 5 | 5 |

TABLE 1-continued

| Material | — | — | — | Aramide | Aramide | Aramide | Nylon | Polyester |
|---|---|---|---|---|---|---|---|---|
| Average diameter (mm) | — | — | — | 0.02 | 0.02 | 0.02 | 0.05 | 0.04 |
| Average length (mm) | — | — | — | 5 | 5 | 5 | 5 | 5 |
| Synthetic resin *1 | 10 | 10 | 10 | 10 | 10 | 10 | 10 | 10 |
| Others (parts by weight) | | | | | | | | |
| Age resistor *2 | 2 | 2 | 2 | 2 | 2 | 2 | 2 | 2 |
| Stearic acid | 2 | 2 | 2 | 2 | 2 | 2 | 2 | 3 |
| Hydrozincite | 3 | 3 | 3 | 3 | 3 | 3 | 3 | 3 |
| Sulfur | 3 | 3 | 3 | 3 | 3 | 3 | 3 | 3 |
| Vulcanization accelerator *3 | 2 | 2 | 2 | 2 | 2 | 2 | 2 | 2 |
| Vulcanization retarder *4 | 0.3 | 0.3 | 0.3 | 0.3 | 0.3 | 0.3 | 0.3 | 0.3 |
| Mooney viscosity (ML1 + 4) | 75 | 115 | 40 | 42 | 43 | 43 | 40 | 41 |
| Scorch time t10 (minute) | 15 | 12 | 19 | 20 | 21 | 20 | 20 | 21 |
| 100% modulus (MPa) | 10 | 12 | 4 | 12 | 14 | — | 10 | 11 |
| Tensile strength TB (MPa) | 20 | 18 | 29 | 23 | 20 | 12 | 23 | 22 |
| Cutting elongation EB (%) | 250 | 170 | 490 | 250 | 210 | 70 | 260 | 250 |

| | 9 | 10 | 11 | 12 | 13 | 14 |
|---|---|---|---|---|---|---|
| Rubber(parts by weight) | 100 | 100 | 100 | 100 | 100 | 100 |
| HAF carbon (parts by weight) | 50 | 50 | 50 | 50 | 50 | 50 |
| Short fiber (parts by weight) | 5 | 5 | 5 | 5 | 5 | — |
| Material | Aramide | Aramide | Aramide | Aramide | Aramide (multi) | — |
| Average diameter (mm) | 0.05 | 0.15 | 0.02 | 0.02 | 0.05 | — |
| Average length (mm) | 5 | 5 | 0.7 | 15 | 5 | — |
| Synthetic resin *1 | 10 | 10 | 10 | 10 | 10 | 10 |
| Others (parts by weight) | | | | | | |
| Age resistor *2 | 2 | 2 | 2 | 2 | 2 | 2 |
| Stearic acid | 3 | 3 | 2 | 2 | 2 | 2 |
| Hydrozincite | 3 | 3 | 3 | 3 | 3 | 3 |
| Sulfur | 3 | 3 | 3 | 3 | 3 | 5 |
| Vulcanization accelerator *3 | 2 | 2 | 2 | 2 | 2 | 3 |
| Vulcanization retarder *4 | 0.3 | 0.3 | 0.3 | 0.3 | 0.3 | 0.3 |
| Mooney viscosity (ML1 + 4) | 42 | 42 | 40 | 43 | 40 | 42 |
| Scorch time t10 (minute) | 20 | 21 | 21 | 22 | 21 | 8 |
| 100% modulus (MPa) | 13 | 12 | 8 | 14 | 11 | 9 |
| Tensile strength TB (MPa) | 21 | 15 | 21 | 18 | 22 | 20 |
| Cutting elongation EB (%) | 230 | 140 | 280 | 150 | 230 | 220 |

*1 SP1068 resin produced by Nippon Shokubai Co., Ltd.
*2 "Knockluck 224" produced by Ouchi Sinko Chemical Industrial Co. LTD.
*3 "Knockseller NS" produced by Ouchi Shinko Chemical Industrial Co. LTD.
*4 "Sunguard" produced by Monsanto Company
*Vulcanizing agent (sulfur) was mixed by means of open roll and others were mixed by means of banbury mixer.

Examples No.4 to 13 have excellent rubber flowing property and scorching resistance while maintaining high strength and rigidity. In examples No.6, 10 and 12, extensibility and strength are decreased because of too much short fiber in example 6, too large diameter of short fibers in example 10, and too long fiber in example 12. In example 11, because the average length of short fibers is short, the rigidity is relatively low.

The bead-apex 5 has a 100% modulus of at least 10.0 MPa, a tensile strength TB of at least 10.0 MPa, an elongation EB at breakage of at least 200%, a Mooney viscosity in the range of 30 to 50 ML1+4 and a scorch time (t10) more than 20 minutes.

The "100% modulus", "tensile strength", and "elongation at breakage" are measured in accordance with testing methods described in "Tensile Testing Method of Vulcanized Rubber" of Japanese Industrial Standard K-6251.

The "Mooney viscosity" and "scorch time (t10)" are measured at a temperature of 130 degrees C. in accordance with the testing methods described in "Mooney viscosity test" and "Mooney scorch test" in "Unvulcanized Rubber Physical Testing Methods" of Japanese Industrial Standard K-6300. The smaller the "Mooney viscosity" value, the better the rubber flowing, and thus the better the processability. The "scorch time (t10)" is a time (minute) required until the value increases by 10 points. The longer the scorch time, the greater the resistance to rubber scorching, and thus the better the processability.

If the average diameter of the short fiber is less than 0.01 mm, or the average length is less than 1.0 mm, or the proportion of the short fiber is less than 3 parts by weight, then reinforcing effect is insufficient, and it is difficult to set the 100% modulus, tensile strength and breaking elongation within the above-mentioned range without increasing the carbon black content. In other words, it is difficult to obtain characteristics of high strength, high rigidity and excellent rubber flowing property and rubber scorching resistance.

If the average diameter of the short fibers is more than 0.20 mm, or the average length is more than 10.0 mm, then the bead-apex is liable to be broken from the short fiber as the staring point. If the proportion of the short fiber exceeds 15 parts by weight, then the hybrid material becomes too hard, and the strength decreases unexpectedly.

The above-mentioned compounding materials are melted during vulcanization, and strong and rigid polymer-alloy of rubber, resin and short fibers is formed. As a result, it becomes possible to obtain the required properties without using a conventional bead core.

The radially outer end 5e of the bead-apex 5 or the above-mentioned radially inner end of the adjacent region G is disposed at a height L1 in the range of from 1.2 to 3.0 times the height Lf of a flange Jf of a standard wheel rim J, each measured from a bead base line BL. The "bead base line BL" is a tire axial line extending through a radial height corresponding to the diameter of the wheel rim. If the height L1 exceeds 3.0 times the height Lf, the effect of improving the bead durability can not be obtained. If the height L1 is less than 1.2 times the height Lf, it is difficult to set the height L1 at such a low value in producing the tire and voids are liable to occur after vulcanization.

The length L of the adjacent region G of the carcass ply is set in the range of from 0.5 to 5.0 times the maximum bead-apex width BW which is the axial distance between the axially innermost point Q1 and the axially outermost point Q2 thereof. If the length L is less than 0.5 times the width BW, the bead durability is decreased. If the length L exceeds 5.0 times the width BW, the bead durability can not be improved any more, and further as the ply edge of the turnup portion 6B is positioned in the sidewall portion 3, poor appearance and ply edge separation are liable to occur in the sidewall portions 3. Furthermore, the weight is increased.

Figure 3:
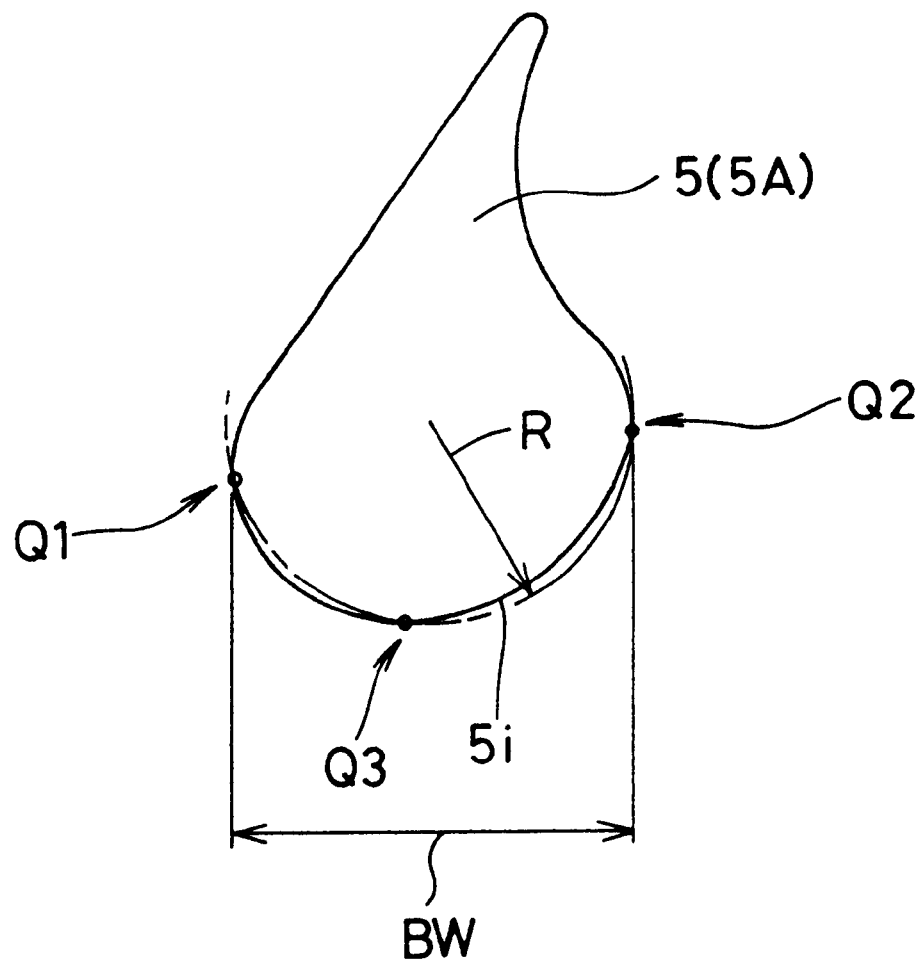
FIG. 3 is a diagram for explaining an average radius of curvature.

In the examples shown in FIG. 2 and FIG. 4, as shown in FIG. 3, a radially inner side 5i of the bead-apex 5 is defined by a radially-inwardly-swelling curve extending along the carcass ply 6a. The average radius R of this curve is set in the range of from 0.19 to 0.41 times the bead apex height L1. If the radius R is less than 0.19 times the height L1, it is difficult to smoothly bent the carcass ply and the cord arrangement is liable to be disturbed. If the radius R is more than 0.41 times the height L1, a springing-back force increases, and voids are liable to occur. The "average radius R" is defined as the radius of a circle passing on three points Q1, Q2 and Q3: the axially innermost point Q1, the axially outermost point Q2 and the radially innermost point Q3. The above-mentioned inner side 5i is defined as extending from Q1 to Q2.

FIG. 4 and FIG. 5 show examples suitable for hard use.

FIG. 4 shows a modification of the above-explained bead portion shown in FIG. 2. In this example, a reinforcing cord layer 8 is disposed in the center of the bead-apex 5. The reinforcing layer 8 is made of circumferentially continuously extending cords 8A. For the cords 8A, high-modulus organic fiber cords such as aromatic polyamide fiber cords or steel cords are preferably used. In FIG. 4, the reinforcing layer 8 is composed of a single ply of cords 8A arranged side by side in the axial direction. It is however also possible to make this layer 8 in a two-ply structure. In case of a single-layered structure, the reinforcing layer 8 is formed by spirally winding a cord 8A several times. In case of a multi-layered structure, it can be formed not only by spirally winding one or more cords but also by winding a strip of rubberized parallel cords 8A.

FIG. 5 shows still another example of the bead portion, in which a bead core 20 is disposed radially inside a bead-apex 5A. The carcass ply 6a is turned up around the bead core 20. The bead-apex 5A in this example has a substantially triangular cross sectional shape tapering radially outwards from the bead core 20. The bead core 20 is formed by compactly coiling a steel wire dozens of times whereas the cord in the reinforcing layer 8 is wound relatively loosely. In the present invention, even if a spring-back force of the turnup portion during vulcanization is strong owing to the presence of the bead core 20, as the bead-apex 5 has low rubber viscosity and excellent rubber flowing property, the bead-apex 5 flow smoothly near to the outer end 5e. Thus, the occurrence of voids is effectively controlled.

Comparison Tests:

Heavy duty radial tires of size 11R22.5 were made and tested for the bead durability, bead strength, and tire weight.

Bead durability test: Each test tire mounted on a standard wheel rim of 8.25×22.5 and inflated to an inner pressure of 1000 kPa was caused to run on a tire testing drum at a speed of 20 km/h with a load of 9000 kgf. The running was stopped when visually observable damage occurred, and a ratio Li/Lo between a distance Li at which the damage occurred and a full running distance Lo of 10000 km was obtained. In Table 2, the ratio Li/Lo is indicated by an index based on the prior art tire being 100. The larger the value, the better the bead durability.

Bead strength test: Each test tire mounted on a standard wheel rim of 8.25×22.5 was filled with water and the pressure was increased. The pressure at which the bead apex was ruptured was measured. The pressure is indicated by an index based on the prior art tire being 100. The larger the value, the higher the bead strength.

Tire weight: The tire weight is indicated by an index based on the prior art tire being 100.

In the test tires, the carcass was composed of a single ply of steel cords (3×0.17+7×0.20) arranged radially at 90 degrees with respect to the tire equator at a cord count of 21 (per 5 cm at the tread central). And the belt was composed of four plies of steel cords (3×0.20+6×0.35) laid at +67, +18, −18 and −18 degrees (from inside to outside) with respect to the tire equator at a cord count of 26 (per 5 cm).

Other specifications of the test tires and test results are shown in Table 2.

TABLE 2

| Tire | A1 | A2 | A3 | A4 | A5 | A6 | A7 | B1 | B2 | B3 | B4 |
|---|---|---|---|---|---|---|---|---|---|---|---|
| Bead apex | | | | | | | | | | | |
| Material No. | 5 | 5 | 5 | 5 | 5 | 5 | 5 | 4 | 4 | 4 | 4 |
| Radius R (mm) | 7.5 | 10.3 | 7.5 | 7.5 | 7.5 | 7.5 | 4.75 | 7.5 | 10.3 | 7.5 | 7.5 |
| Height L1 (mm) | 25 | 25 | 32 | 32 | 12.7 | 25 | 25 | 25 | 25 | 32 | 32 |
| R/L1 | 0.3 | 0.41 | 0.3 | 0.3 | 0.6 | 0.3 | 0.19 | 0.3 | 0.41 | 0.3 | 0.3 |
| Width BW (mm) | 15 | 15 | 15 | 15 | 15 | 15 | 12 | 15 | 15 | 15 | 15 |
| Rim flange height Jf(mm) | 12.5 | 12.5 | 12.5 | 12.5 | 12.5 | 12.5 | 12.5 | 12.5 | 12.5 | 12.5 | 12.5 |
| L1/Jf | 2 | 2 | 2.5 | 2.5 | 1 | 2 | 2 | 2 | 2 | 2.5 | 2.5 |
| Length L (mm) | 60 | 60 | 7.5 | 6.5 | 60 | 76.5 | 60 | 60 | 60 | 7.5 | 6.5 |
| L/BW | 4 | 4 | 0.5 | 0.43 | 4 | 5.1 | 5 | 4 | 4 | 0.5 | 0.43 |
| Reinforcing layer | *1 | *1 | *1 | *1 | *1 | *1 | *1 | *1 | *1 | *1 | *1 |

TABLE 2-continued

Test results

| Void | non | Present | non | non | non | non | non | non | Present | non | non |
|---|---|---|---|---|---|---|---|---|---|---|---|
| Bead durability | 150 | 110 | 120 | 80 | — | 150 | — | 145 | 108 | 110 | 80 |
| Bead strength | 110 | 110 | 110 | 110 | 110 | 110 | 110 | 108 | 108 | 108 | 108 |
| Tire weight | 96 | 95 | 94 | 94 | — | 105 | — | 96 | 95 | 94 | 94 |

|  | B5 | B6 | B7 | C1 | C2 | C3 | C4 | C5 | C6 | C7 | Prior |
|---|---|---|---|---|---|---|---|---|---|---|---|
| Bead apex |  |  |  |  |  |  |  |  |  |  |  |
| Material No. | 4 | 4 | 4 | 8 | 8 | 8 | 8 | 8 | 8 | 8 | 1 |
| Radius R (mm) | 7.5 | 7.5 | 4.75 | 7.5 | 10.3 | 7.5 | 7.5 | 7.5 | 7.5 | 4.75 | 9.74 |
| Height L1 (mm) | 12.7 | 25 | 25 | 25 | 25 | 32 | 32 | 12.7 | 25 | 25 | 36 |
| R/L1 | 0.6 | 0.3 | 0.19 | 0.3 | 0.41 | 0.3 | 0.3 | 0.6 | 0.3 | 0.19 | 0.27 |
| Width BW (mm) | 15 | 15 | 12 | 15 | 15 | 15 | 15 | 15 | 15 | 12 | 12 |
| Rim flange height Jf (mm) | 12.5 | 12.5 | 12.5 | 12.5 | 12.5 | 12.5 | 12.5 | 12.5 | 12.5 | 12.5 | 12.5 |
| L1/Jf | 1 | 2 | 2 | 2 | 2 | 2.5 | 2.5 | 1 | 2 | 2 | 2.83 |
| Length L (mm) | 60 | 76.5 | 60 | 60 | 60 | 7.5 | 6.5 | 60 | 76.5 | 60 | 60 |
| L/BW | 4 | 5.1 | 5 | 4 | 4 | 0.5 | 0.43 | 4 | 5.1 | 5 | 5 |
| Reinforcing layer | *1 | *1 | *1 | *1 | *1 | *1 | *1 | *1 | *1 | *1 | *2 |
| Test results |  |  |  |  |  |  |  |  |  |  |  |
| Void | non | non | non | non | Present | non | non | non | non | non | non |
| Bead durability | — | 145 | — | 135 | 105 | 110 | 70 | — | 140 | — | 100 |
| Bead strength | 108 | 108 | 108 | 103 | 103 | 103 | 103 | 103 | 103 | 103 | 100 |
| Tire weight | — | 105 | — | 96 | 95 | 94 | 94 | — | 105 | — | 100 |

Figure 6A:
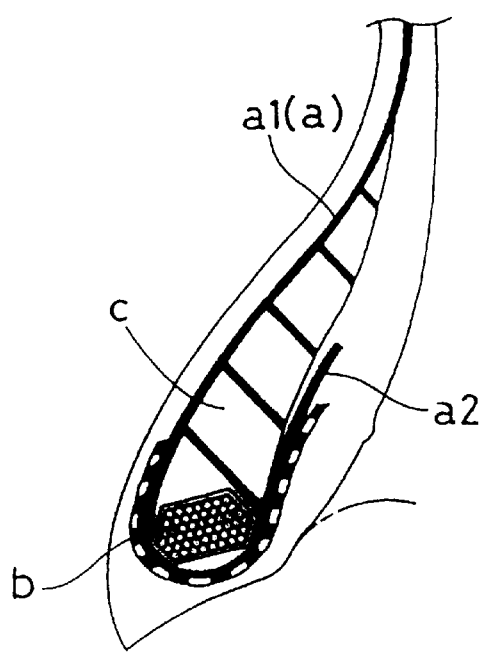
FIGS. 6(A) and 6(B) are cross sectional views of a bead portion for explaining prior art.
Figure 6B:
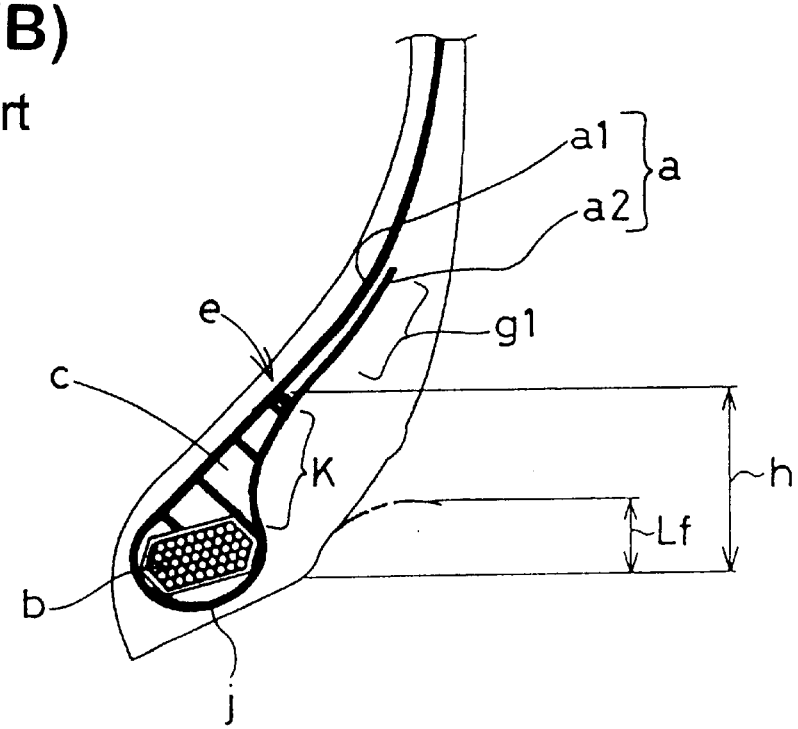

*1: FIG. 4, single layer of eight turns' steel cord
*2: Conventional bead core shown in FIG. 6(B), coiled steel wire was used.

As described above, in the pneumatic tire according to the present invention, the bead apex is improved in the rubber flowing property and scorching resistance (processability) as well as the strength and rigidity. Therefore, the occurrence of voids can be effectively controlled without increasing the height of the bead apex. Thus, the bead durability and tire weight can be improved.

The present invention can be suitably applied to heavy duty tires, but it is also possible to apply to tires for light tracks, passenger cars, motorcycles, and the like.

What is claimed is:

1. A pneumatic tire comprising a tread portion, a pair of sidewall portions, a pair of bead portions, a bead apex disposed in each of the bead portions, a carcass ply extending between the bead portions and turned up in each of the bead portions so as to wrap the bead apex therein, said bead apex made of a hybrid material which is compounded from rubber, synthetic resin and short fiber at least.

2. The pneumatic tire according to claim 1, wherein said hybrid material has a 100% modulus of at least 10.0 MPa, a tensile strength of at least 10.0 MPa, a breaking elongation EB of at least 200%, a Mooney viscosity of from 30 to 50 ML 1+4, and a scorch time (t10) of at least 20 minutes.

3. The pneumatic tire according to claim 1, wherein said short fiber has an average diameter of 0.01 to 0.20 mm and an average length of 1.0 to 10.0 mm, and the proportion of the short fiber is 3 to 15 parts by weight with respect to 100 parts by weight of said rubber.

4. The pneumatic tire according to claim 1, wherein said bead apex has a cross sectional shape like a water drop, of which radially inner side is curved, and which tapers radially outward of the tire.

5. The pneumatic tire according to claim 1, wherein said bead apex has a cross sectional shape like a water drop, of which radially inner side is curved, and which tapers radially outward of the tire, and a reinforcing layer, which is made of an organic fiber cord or a steel cord extending continuously in the tire circumferential direction, is embedded in the bead apex.

6. The pneumatic tire according to claim 1, wherein said bead apex has a triangular cross sectional shape which tapers radially outward of the tire, and a bead core is disposed immediately radially inside said bead apex.

* * * * *

UNITED STATES PATENT AND TRADEMARK OFFICE
CERTIFICATE OF CORRECTION

PATENT NO.    : 6,318,430 B1                                               Page 1 of 1
DATED         : November 20, 2001
INVENTOR(S)   : Kiyoshi Ueyoko et al.

It is certified that error appears in the above-identified patent and that said Letters Patent is hereby corrected as shown below:

<u>Title page,</u>
Please insert item [30] Foreign Application Priority Data as follows:

-- [30]    Foreign Application Priority Data
        Jun 19, 1998  [JP]    Japan ........................ 10-173526
        Mar 26, 1999  [JP]    Japan ........................ 11-84193 --.

Signed and Sealed this

Tenth Day of September, 2002

*Attest:*

*Attesting Officer*

JAMES E. ROGAN
*Director of the United States Patent and Trademark Office*